(12) United States Patent
Potter

(10) Patent No.: US 9,952,572 B2
(45) Date of Patent: Apr. 24, 2018

(54) OBJECT PRODUCTION USING AN ADDITIVE MANUFACTURING PROCESS

(71) Applicant: BAE SYSTEMS PLC, London (GB)

(72) Inventor: Mark Alfred Potter, Preston (GB)

(73) Assignee: BAE SYSTEMS PLC, London (GB)

( * ) Notice: Subject to any disclaimer, the term of this patent is extended or adjusted under 35 U.S.C. 154(b) by 285 days.

(21) Appl. No.: 14/761,720

(22) PCT Filed: Jan. 15, 2014

(86) PCT No.: PCT/GB2014/050108
§ 371 (c)(1),
(2) Date: Jul. 17, 2015

(87) PCT Pub. No.: WO2014/111707
PCT Pub. Date: Jul. 24, 2014

(65) Prior Publication Data
US 2015/0362898 A1    Dec. 17, 2015

(30) Foreign Application Priority Data

Jan. 17, 2013  (EP) ..................................... 13275013
Jan. 17, 2013  (GB) .................................. 1300852.9

(51) Int. Cl.
*G05B 15/02*    (2006.01)
*G05B 19/4099*  (2006.01)
(Continued)

(52) U.S. Cl.
CPC .............. *G05B 15/02* (2013.01); *B33Y 10/00* (2014.12); *B33Y 50/02* (2014.12);
(Continued)

(58) Field of Classification Search
CPC ................ G05B 15/02; G05B 19/4099; G05B 2219/35017; G05B 2219/35081;
(Continued)

(56) References Cited

U.S. PATENT DOCUMENTS 6,044,210 A    3/2000  Nagtegaal

FOREIGN PATENT DOCUMENTS

EP    1457853 A1    9/2004

OTHER PUBLICATIONS

Herbert et al., "A preliminary investigation into the development of 3-D printing of prosthetic sockets", Journal of Rehabilitation Research, Mar./Apr. 2005.*

(Continued)

*Primary Examiner* — Carlos Ortiz Rodriguez
(74) *Attorney, Agent, or Firm* — Maine Cernota & Rardin

(57) ABSTRACT

A method and apparatus for producing an object (2) comprising providing a digital model (14) of the object (2) that is to be produced; using the digital model, identifying one or more parts (8) of the object (2) that satisfy certain criteria; for each identified part (8), adjusting, in the digital model (14), the thickness of that part (8) to satisfy further criteria, thereby producing an updated model; performing a first production process to produce the part or parts (4, 6) of the object (2) that do not satisfy the criteria, thereby producing an initial object (17); performing an Additive Manufacturing process to add, to the initial object (17), the one or more identified parts (8), thereby producing the object (2). The initial object (17) and identified parts (8) are made of the same material. The first production process is different to the Additive Manufacturing process.

13 Claims, 5 Drawing Sheets

(51) Int. Cl.
    *B33Y 10/00* (2015.01)
    *B33Y 50/02* (2015.01)
(52) U.S. Cl.
    CPC .............. *G05B 19/4099* (2013.01); *G05B 2219/35017* (2013.01); *G05B 2219/35081* (2013.01); *G05B 2219/49023* (2013.01); *Y02P 90/265* (2015.11)
(58) Field of Classification Search
    CPC .......... G05B 2219/49023; B33Y 10/00; B33Y 50/02; Y02P 90/265
    See application file for complete search history.

(56) References Cited

OTHER PUBLICATIONS

Wang et al., "Microstructures and Mechanical Properties of Wire and Arc Additive Manufactured Ti-6AI-4V", The Minerals, Metals & Materials Society and ASM International, First Online: Sep. 28, 2012, DOI: 10.1007/s11661-012-1444-6.*

EP Search Report dated May 15, 2013 of Patent Application No. 13275013.4 filed Jan. 17, 2013.

GB Search Report dated Jul. 11, 2014 of Patent Application No. 1400657.1 filed Jan. 17, 2013.

Oliver Kerbrat et al: "A new DFM approach to combine machining and additive manufacturing", Computers in Industry, Elsevier Science Publishers. Amsterdam, NL. vol. 62, No. 7, Apr. 7, 2011, pp. 684-692, XP028247482, ISSN: 0166-3615, DOI: 10.1016/J. Compind. 2011.04.003 [retrieved on Apr. 14, 2011].

Jian Chen: "Hybrid design based on wire and arc additive manufacturing in the aircraft industry", Dec. 1, 2012, XP055062284, Retrieved from the internet: URL:https://dspace.lib.cranfield.ac.uk/bitstream/1826/7863/1/Jian_CHen_Thesis_2012.pdf [retrieved on May 8, 2013].

Kerbat O et al: "Manufacturability analysis to combine additive and subtractive processes", 2010, Rapid Prototyping Journal, pp. 63-72, vol. 16.

R. Ponche et al: "A new global approach to design for additive manufacturing", 2013, Virtual and Physical Prototyping, pp. 93-105, vol. 7 part 2.

Alphons A. Antonysamy: "Mechanical Properties of AM Test Samples", Microstructure, Texture and Mechanical Property Evolution during Additive Manufacturing of Ti6Ai4V Alloy for Aerospace Applications, pp. 268-297.

* cited by examiner

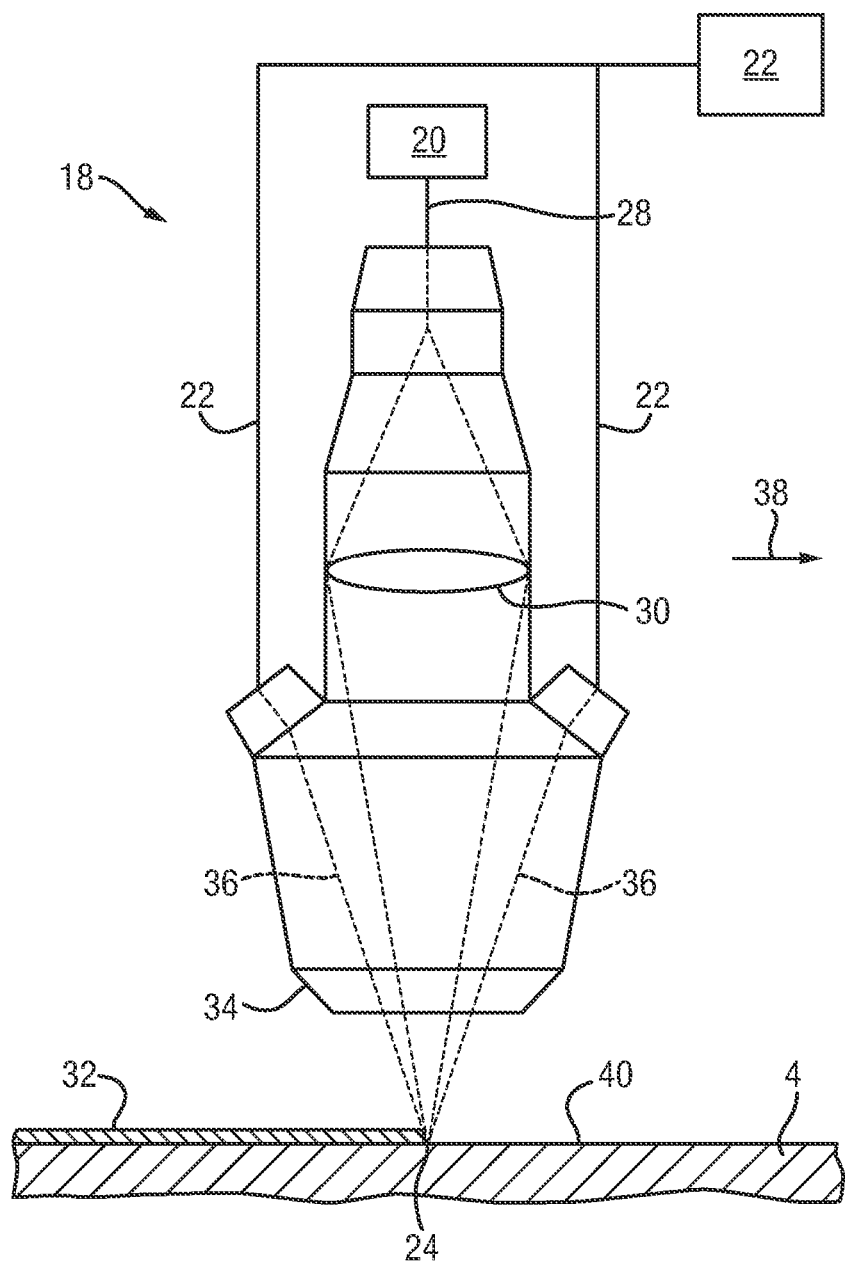

OBJECT PRODUCTION USING AN ADDITIVE MANUFACTURING PROCESS

RELATED APPLICATIONS

This application is a national phase application filed under 35 USC § 371 of PCT Application No. PCT/GB2014/050108 with an International filing date of 15 Jan. 2014 which claims priority of GB Patent Application 1300852.9 filed 17 Jan. 2013 and EP Patent Application 13275013.4 filed 17 Jan. 2013. Each of these applications is herein incorporated by reference in their entirety for all purposes.

FIELD OF THE INVENTION

The present invention relates to the production of objects.

BACKGROUND

Typically, component parts for aircraft are produced by taking castings, slab stock, plate, bar, or forgings, etc. and then by machining away surplus material to produce the component parts.

Additive Manufacturing (AM) (also known as Additive Layer Manufacture (ALM), 3D printing, etc.) is a process that may be used to produce functional, complex objects, layer by layer, without moulds or dies. Typically, such processes include providing material (e.g. metal or plastic) in the form of a powder or a wire. Using a powerful heat source such as a laser beam, Electron Beam (EB) or an electric or plasma welding arc, an amount of that material is melted and deposited (e.g. on a base plate of a work piece). Subsequent layers are then built up upon each preceding layer.

Example AM processes include, but are not limited to, Laser Blown Powder, Laser Wire feed, Laser Powder Bed, EB Wire and electric or plasma welding arc technologies.

"A new Design For Manufacture (DFM) approach to combine machining and additive manufacturing", Olivier Kerbrat et al discloses a Design For Manufacturing (DFM) approach in which quantitative information is provided during the product design stage of which product modules will benefit in being machined and which ones will advantageously be realized by an additive process (such as Selective Laser Sintering or laser deposition). A methodology for a manufacturability evaluation in case of a subtractive or an additive manufacturing process is provided.

SUMMARY OF THE INVENTION

In a first aspect, the present invention provides a method of producing an object, the method comprising: providing an initial digital model of the object that is to be produced; using the initial digital model, identifying, by a processor, a part of the object that would experience a stress force in excess of a predetermined threshold value if the object was loaded with a predetermined load; adjusting, in the digital model, a thickness (in some direction) of the identified part (i.e. reducing the cross sectional area of that identified part) to be less than a thickness value, thereby producing an updated digital model, wherein the thickness value is a minimum thickness for the identified part that, if the part was made from a predefined material using a first production process, would allow the identified part to withstand being loaded with the predefined load for a predefined number of design cycles; performing the first production process to produce an initial object comprising the part or parts of the object other than the identified part; and, using the updated digital model, performing, using an Additive Manufacturing apparatus, an Additive Manufacturing process to add, to the initial object, the identified part, thereby producing the object. The initial object and the identified part of the object are made of the same predefined material. The first production process is a different type of process to the Additive Manufacturing process. The present invention exploits mechanical benefits that may be provided by Additive Manufacturing processes.

The object may be a component part of an aircraft.

The first production process may comprise one or more production processes selected from the group of production processes consisting of: a subtractive manufacturing process, a forging process, Rolled Plate or bar process, a casting process, a moulding process, a forming process, and a machining process.

The Additive Manufacturing process may be a process selected from the group of Additive Manufacturing processes consisting of: a blown powder Additive Manufacturing process, a powder bed fusion Additive Manufacturing process, a sheet lamination Additive Manufacturing process, a laser blown powder Additive Manufacturing process, a laser powder bed Additive Manufacturing process, and an Additive Manufacturing process that implements wire and electron beam or electric plasma arc technology.

The identified part may be such that, were the object to be loaded with the predetermined load, the identified part would experience a stress force that is relatively high compared to those forces that occur in other parts of the object. The identified part may be such that, were the object to be loaded with the predetermined load, a proportion of the identified part in which relatively high stress forces occur would exceed a predetermined threshold proportion.

The step of identifying a part of the object that would experience a stress force in excess of a predetermined threshold value if the object was loaded with a predetermined load may comprise performing a finite element analysis process on the digital model.

The step of adjusting the thickness of the identified part in the digital model may comprise adjusting the thickness of that part to be equal to a further thickness value. The further thickness value may be a minimum thickness for the identified part that, if the part was made from the predefined material using the Additive Manufacturing process, would allow the identified part to withstand being loaded with the predefined load for the predefined number of design cycles. The step of performing the Additive Manufacturing process may comprise: providing a further digital model, the further digital model being a digital model of the initial object; using the further digital model and the updated digital model, determining, by a processor, a tool path for the Additive Manufacturing apparatus; and following, by the Additive Manufacturing apparatus (18), the determined tool path.

The object may be made of titanium.

In a further aspect, the present invention provides apparatus for producing an object, the apparatus comprising: one or more processors configured to: using an initial digital model of the object that is to be produced, identify a part of the object that would experience a stress force in excess of a predetermined threshold value if the object was loaded with a predetermined load; and adjust, in the initial digital model, the thickness of the identified part to be less than a thickness value, thereby producing an updated digital model, wherein the thickness value is a minimum thickness for the identified part that, if the part was made from a predefined material using a first production process, would allow the identified part to withstand being loaded with the predefined load for a predefined number of design cycles; production means configured to perform the first production process to produce an initial object comprising the part or parts of the object other than the identified part; and Additive Manufacturing apparatus configured to, using the updated digital model, perform an Additive Manufacturing process to add, to the initial object, the identified part, thereby producing the object. The initial object and the identified part of the object are made of the same predefined material. The first production process is a different type of process to the Additive Manufacturing process.

In a further aspect, the present invention provides an object produced using a method according to any of the preceding aspects.

In a further aspect, the present invention provides an aircraft comprising an aircraft component produced using a method according to any of the preceding aspects.

In a further aspect, the present invention provides a method of producing an object, the method comprising: providing a digital model of the object that is to be produced; using the digital model, identifying, by a processor, one or more parts of the object that is to be produced that satisfy one or more criteria; for each part that satisfies the one or more criteria, adjusting, in the digital model, the thickness of that part such that one or more further criteria are satisfied, thereby producing an updated digital model; performing a first production process to produce the part or parts of the object that is to be produced that do not satisfy the one or more criteria, thereby producing an initial object; using the updated digital model, performing, using an Additive Manufacturing apparatus, an Additive Manufacturing process to add, to the initial object, the one or more parts that satisfy the one or more criteria, thereby producing the object; wherein the initial object and the one or more parts of the object that satisfy the one or more criteria are made of the same material, and the first production process is a different type of process to the Additive Manufacturing process (i.e. a non-Additive Manufacturing process).

The first production process may comprise one or more production processes selected from the group of production processes consisting of: a forging process, Rolled Plate or bar process, a casting process, a moulding process, a forming process, and a machining process.

The Additive Manufacturing process may be a process selected from the group of Additive Manufacturing processes consisting of: a blown powder Additive Manufacturing process, a powder bed fusion Additive Manufacturing process, a sheet lamination Additive Manufacturing process, a laser blown powder Additive Manufacturing process, a laser powder bed Additive Manufacturing process, and an Additive Manufacturing process that implements wire and electron beam or arc technology.

A part of the object to be produced may be identified as satisfying the one or more of criteria if, using the digital model, it is determined that, were the object to be loaded with a predetermined load, stress forces that occur in that part are relatively high compared to those forces that occur in other parts of the object.

A part of the object to be produced may be identified as satisfying the one or more of criteria if, using the digital model, it is determined that, were the object to be loaded with a predetermined load, a proportion of that part in which relatively high stress forces occur exceeds a predetermined threshold proportion.

A part of the object to be produced may be identified as satisfying the one or more of criteria if, using the digital model, it is determined that, were the object to be loaded with a predetermined load, stress forces experienced by that part exceed a predetermined threshold value.

The step of identifying one or more parts of the object that is to be produced that satisfy one or more criteria may comprise performing a finite element analysis process on the digital model.

The step of, for each part that satisfies the one or more criteria, adjusting the thickness of that part in the digital model may comprise adjusting the thickness of that part to be equal to a minimum thickness that the part must have in order to be able to withstand being loaded with a predefined load for a predefined number of design cycles.

A minimum thickness that a part made using the Additive Manufacturing process must have in order to be able to withstand being loaded with a predefined load, e.g. a fluctuating load as might be experienced in the aircraft total design flight profile, for a predefined number of design cycles may be less than a minimum thickness that a further part made from the same material as the part and using the first production process must have in order to be able to withstand being loaded with the predefined load for the predefined number of design cycles.

The step of performing the Additive Manufacturing process may comprise providing a further digital model, the further digital model being a digital model of the initial object, and using the further digital model and the updated digital model, determining, by a processor, a tool path for the Additive Manufacturing apparatus, and following, by the Additive Manufacturing apparatus, the determined tool path.

The object may be made of titanium.

The object may be a component part of an aircraft.

In a further aspect, the present invention provides apparatus for producing an object, the apparatus comprising: a processor configured to identify, using a provided digital model of the object that is to be produced, one or more parts of the object that is to be produced that satisfy one or more criteria, and, for each part that satisfies the one or more criteria, adjust, in the digital model, the thickness of that part such that one or more further criteria are satisfied, thereby producing an updated digital model; production means configured to perform a first production process so as to produce the part or parts of the object that is to be produced that do not satisfy the one or more criteria, thereby producing an initial object; and an Additive Manufacturing apparatus configured to perform an Additive Manufacturing process to add, to the initial object, the one or more parts of the object identified as satisfying the one or more criteria, thereby producing the object; wherein the first production process is a different type of process to the Additive Manufacturing process.

In a further aspect, the present invention provides a program or plurality of programs arranged such that when executed by a computer system or one or more processors it/they cause the computer system or the one or more processors to operate in accordance with the method of any of the above aspects.

In a further aspect, the present invention provides a machine readable storage medium storing a program or at least one of the plurality of programs according to the preceding aspect.

BRIEF DESCRIPTION OF THE DRAWINGS

FIG. 6 is a schematic illustration (not to scale) showing apparatus performing an Additive Manufacturing process.

DETAILED DESCRIPTION

Figure 1:
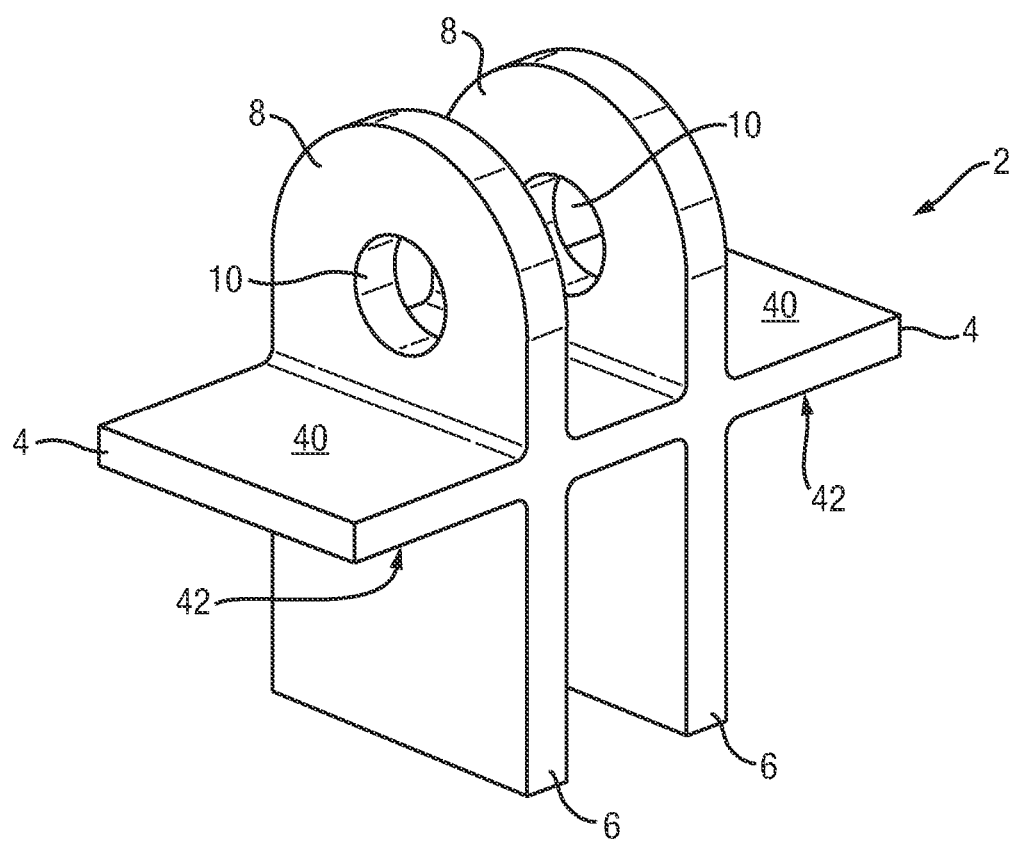
FIG. 1 is a schematic illustration (not to scale) of an example object that is to be produced.

FIG. 1 is a schematic illustration (not to scale) of an example object 2 that is to be produced. An embodiment of a process of producing the object 2 is described in more detail later below with reference to FIGS. 2 to 5. The method of producing the object 2 comprises performing an Additive Manufacturing (AM) process. The apparatus that will be used to perform the AM process is hereinafter referred to as the "AM apparatus" and is described in more detail later below with reference to FIG. 6.

The terminology Additive Manufacturing (AM) is used herein to refer to all additive processes that may be used to produce functional, complex objects, layer by layer, without moulds or dies e.g. by providing material (e.g. metal) in the form of a powder or a wire, and, using a powerful heat source such as a laser beam, electron beam or an electric, or plasma welding arc, melting an amount of that material and depositing the melted material (e.g. on a base plate of a work piece), and subsequently building layers of material upon each preceding layer.

The terminology Additive Manufacturing (AM) is used herein to refer to blown powder AM processes, powder bed fusion AM processes, etc. AM processes, laser blown powder AM processes, a laser powder bed AM processes, and AM processes that implement wire and arc technology.

Additive Manufacturing (AM) processes may also be known as 3D printing, Direct Digital Manufacturing (DDM), Digital Manufacture (DM), Additive Layer Manufacture (ALM), Rapid Manufacture (RM), Laser Engineering Net Shaping (LENS), Direct Metal deposition, Direct Manufacturing, Electron Beam Melting, Laser Melting, Freeform fabrication, Laser Cladding, and Direct Metal Laser Sintering.

The object 2 may be any appropriate type of object, for example, a component part of a device or machine, such as an aircraft.

In this embodiment, the object 2 is made of titanium or a titanium alloy.

The object 2 comprises a rectangular plate (hereinafter referred to as the "rectangular portion" and indicated in FIG. 1 by the reference numeral 4), two further rectangular plates (hereinafter referred to as the "further rectangular portions" and indicated in FIG. 1 by the reference numeral 6), and two approximately semi-circular plates (hereinafter referred to as the "curved portions" and indicated in FIG. 1 by the reference numeral 8).

The rectangular portion 4 is an approximately rectangular plate of material. The rectangular portion 4 includes a first surface 40 and a second surface 42 that is on an opposite side of the rectangular portion 4 to the first surface 40.

Each of the two further rectangular portions 6 is an approximately rectangular plate of material. Each of the two further rectangular portions 6 are connected, along one of their straight edges, to the second surface 42 of the rectangular portion. The two further rectangular portions 6 are connected to the second surface 42 such that they are both substantially perpendicular to the second surface 42, and such that they are substantially parallel to one another.

Each of the two curved portions 8 is an approximately semi-circular plate of material. Each of the two curved portions 8 are connected, along their straight edge, to the first surface 40 of the rectangular portion 4. The two curved portions 8 are connected to the first surface 40 such that they are both substantially perpendicular to the first surface 40, and such that they are substantially parallel to one another. Furthermore, each of the curved portions 8 is connected to first surface 40 of the rectangular portion 4 such that it is directly opposite to a respective further rectangular portion 6 on the second surface 42.

Each of the curved portions 8 comprises a hole 10 through its structure, from one semi-circular side to the other. In this embodiment, the two curved portions 8 are arranged such that the axes of the holes 10 are aligned (e.g. such that a shaft or other object may be passed through both holes 10).

What will now be described is an embodiment of a process of producing objects. In the below described embodiment, the example object 2 (shown in FIG. 1 and described above) is produced. However, in other embodiments, the method of producing an object is used to produce an object of a different type and/or shape and/or size to that shown in FIG. 1. Also, in other embodiments, the object produced by the method is made of a different material to the object 2 in this embodiment.

Figure 2:
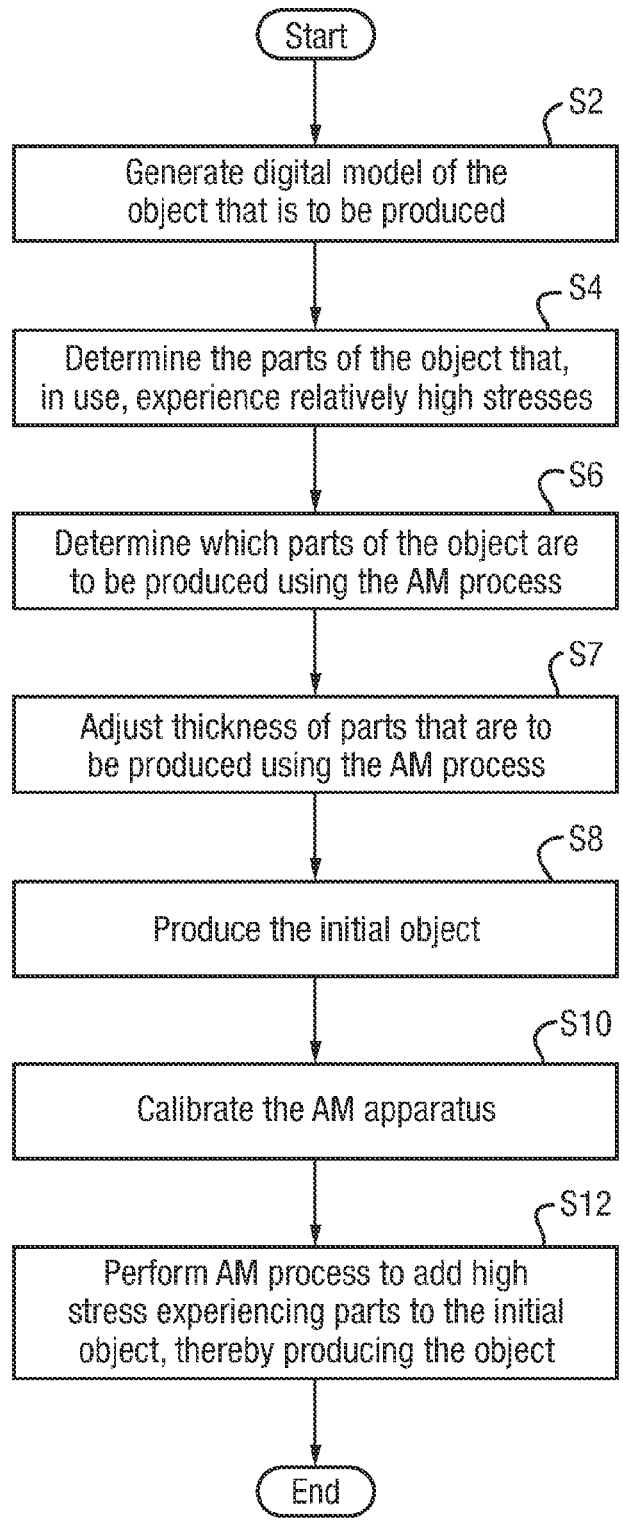
FIG. 2 is a process flow chart of an embodiment of a process of producing the object.

FIG. 2 is a process flow chart of an embodiment of a process of producing (i.e. manufacturing, building, constructing, etc.) the above described example object 2.

At step s2, a three dimensional digital model of the object 2 is provided. The digital model of the object 2 is a digital design model for the object 2.

In other words, a three dimensional digital model of the object that is to be produced is provided.

The digital model for the object 2 may be provided using any suitable apparatus, for example one or more computers or other processing apparatus or processors, and/or additional modules. The apparatus used to provide the digital model of the object 2 may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

In this embodiment, the provided digital model of the object 2 can be viewed, manipulated and analysed using the apparatus e.g. by implementing a suitable software package or tool.

At step s4, the digital model of the object 2 is analysed or processed (e.g. using the apparatus used to provide the digital model) so as to determine or identify, when the object is in use, which portions, or parts, of the object 2 experience relatively high stresses (or would tend to, or most likely experience relatively high stresses). The terminology "relatively high stresses" are used herein to refer to forces acting within a portion of the body of the object 2 (i.e. internal forces, or stress forces) that are large compared to internal forces acting within a different portion of the body of the object 2. In other words, the regions of the object that, when the object 2 is used (e.g. for its intended purpose), experience the highest stresses are determined. Stress forces may be regarded as being "relatively high" if, for example, they exceed a threshold force value, or by using any other appropriate criteria.

This process of determining the most highly stressed portions of the object 2 may be performed using any suitable processing method or software package. Examples of appropriate software packages include, but are not limited to, NASTRAN, PATRAN, Optistruct, Hyperworks, and Solid-Thinking Inspired etc. In this embodiment, any appropriate Finite Element Analysis software package may be used to predict where stresses in the object 2 would occur. In other words, the identification of the parts of the object 2 that, in use (i.e. when loaded in a certain way with a predetermined load), experience relatively high stresses, comprises performing a finite element analysis process on the digital model 14.

Figure 3:
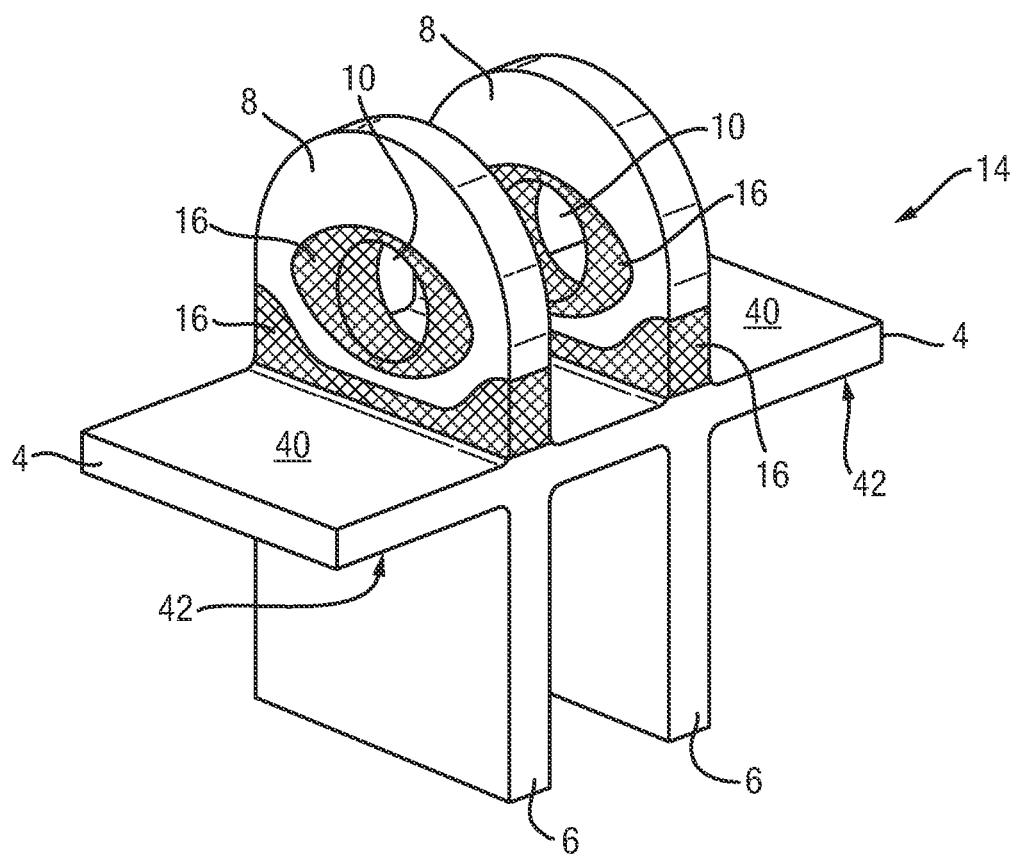
FIG. 3 is a schematic illustration of a digital model of the object.

FIG. 3 is a schematic illustration of a digital model 14 of the object 2.

For convenience and ease of understanding, the parts of the digital model 14 have been labelled with the reference numerals that indicate the corresponding parts of the object 2. In other words, the part of the digital model that corresponds to the rectangular portion 4 has been labelled with the reference numeral 4, etc.

The parts of the digital model 14 that correspond to those parts of the object 2 that have been determined to, during use of the object 2, experience relatively high stresses are hereinafter referred to as "high stress regions". The high stress regions are shown in FIG. 3 as hashed-regions, and are indicated by the reference numerals 16.

In this embodiment, it is determined that the high stress regions are located in the curved portions 8 of the object 2.

At step s6, using the digital model 14 and the identified high stress regions 16, it is determined which portions of the object 2 are to be produced using an Additive Manufacturing (AM) process, and which portions of the object 2 are to be produced using a different suitable process.

In this embodiment, the different process (i.e. the process for producing parts of the object 2 that is different to the AM process) includes performing a forging process. Also, the different process may comprise a machining process in which surplus material is machined away from the forged portion. In other embodiments, a different type of process may be used instead of or in addition to the forging and/or machining processes. Examples of suitable different processes include, but are not limited to moulding processes (e.g. powder metallurgy processes e.g. metal injection moulding), forming processes (e.g. extrusion process), casting processes (e.g. die casting), and machining processes (e.g. in which a machining tool is used to machine a solid object from a larger solid object).

In this embodiment, a portion, or part, of the object 2 is determined to be a portion that is to be produced using an AM process if, in the digital model 14, the proportion of that portion that is a high stress region 16 is above a predetermined threshold value. In other words, for a part of the object 2, if the proportion of that part that is a high-stress region 16 is above a predetermined threshold value, then it is determined that that part is to be produced using the AM process as opposed to using the forging process. A part produced using the AM process tends to benefit from improved mechanical properties provided by the AM process.

Similarly, in this embodiment, a portion of the object 2 is determined to be a portion that is to be produced using the forging process if, in the digital model 14, the proportion of that portion that is a high stress region 16 is less than or equal to the predetermined threshold value. In other words, for part of the object 2, if the proportion of that part that is a high-stress region 16 is less than or equal to the predetermined threshold value, then it is determined that that part is to be produced using the forging process as opposed to an AM process.

The predetermined threshold value may be any appropriate threshold value.

In this embodiment, as shown in FIG. 3, the curved portions 8 comprise regions that are high-stress regions 16. Furthermore, in this embodiment, for each curved portion 8, the proportion of that curved portions 8 that is a high stress region 16 is above the predetermined threshold value. Thus, at step s6, it is determined that the curved portions 8 of the object 2 are to be produced using an AM process.

In this embodiment, as shown in FIG. 3, the rectangular portion 4 and the further rectangular portions 6 comprise no high-stress regions 16. Thus, for the rectangular portion 4 and the further rectangular portions 6, the proportion of those portions that is a high stress region 16 is less than or equal to the predetermined threshold value. Thus, at step s6, it is determined that the rectangular portion 4 and the further rectangular portions 6 of the object 2 are to be produced using the forging process.

At step s7, for each portion of the object 2 that is to be produced using the Additive Manufacturing (AM) process (i.e. the curved portions 8 of the object 2 in this embodiment), the thickness of that portion in the digital model 14 is adjusted until one or more criteria are satisfied.

Thus, the digital model is updated or modified (thereby producing an "updated digital model") such that the thickness of each portion of the object 2 that is to be produced using the Additive Manufacturing (AM) satisfy one or more criteria.

In this embodiment, for each portion of the object 2 that is to be produced using the Additive Manufacturing (AM) process, the thickness of that portion in the digital model 14 is adjusted until it is equal to the minimum thickness that can withstand being loaded with a predefined maximum load, for a predefined number of design cycles, before the onset of failure. This thickness may be determined, for example, based on experimental data. In other embodiments, different appropriate criteria may be satisfied.

In other words, at step s7, for each portion of the object 2 that is to be produced using the Additive Manufacturing (AM) process, the thickness of that part in the digital model 14 is adjusted such that it is substantially equal to a minimum thickness that that portion of the object 2 must have in order to be able to withstand being loaded with a predefined load for a predefined number of design cycles. In some embodiment, the thickness of each portion of the object 2 that is to be produced using the Additive Manufacturing (AM) process is maintained and, thus, that portion tend to be capable of withstanding an increased number of design cycles compared to if the thickness of that portion was reduced.

Figure 4:
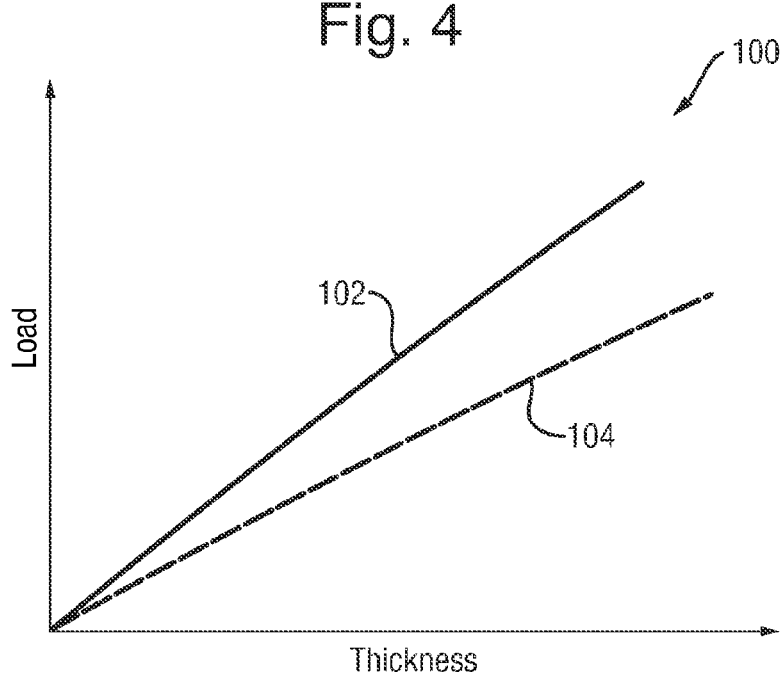
FIG. 4 is a schematic illustration (not to scale) showing a graph.

FIG. 4 is a schematic illustration (not to scale) showing a graph 100. The solid line 102 on the graph 100 illustrates an example relationship between a maximum load that an entity (made of the same material that the object 2 is to be produced from and made using the AM process) is able to withstand for a fixed number of design cycles (e.g. $10^6$-$10^7$ cycles) before the onset of failure, and the thickness (i.e. cross-sectional size) of that entity.

In this embodiment, object parts that have been produced using an AM process are capable of handling a similar dynamic stress to other object parts that have been produced using a different process (e.g. forging, casting, etc.), whilst having a reduced cross sectional size compared to those other object parts. The dotted line 104 on the graph 100 illustrates an example relationship between a maximum load that an entity (made of the same material that the object 2 is to be produced from, and made using a non-AM process mentioned herein, e.g. forging, casting etc.) is able to withstand for the fixed number of design cycles (e.g. $10^6$-$10^7$ cycles) before the onset of failure and the thickness (i.e. cross-sectional size) of that entity.

Thus, in this embodiment, at step s7, for each portion of the object 2 that is to be produced using the Additive Manufacturing (AM) process, the thickness of that part in the digital model 14 is adjusted such that it is less than a thickness value. This thickness value is a minimum thickness for the identified part that, if that part was made from the object material using a non-AM process mentioned herein (e.g. forging, casting etc.), would allow that identified part to withstand being loaded with the predefined load for a predefined number of design cycles. This thickness value may be determined using any appropriate process, such as from experiment or using analytical methods.

In this embodiment, the thicknesses of the portions of the object 2 that are to be made using the AM process are selected to be smaller than the thicknesses that those portions would be were those portions to be made using the non-AM process.

At step s8, the rectangular portions 4 and the further rectangular portions 6 connected to the rectangular portion 4 are produced by, in this embodiment, performing a forging and machining process. The rectangular portions 4 and the further rectangular portions 6 connected to the rectangular portion 4 are hereinafter referred to as the "initial object".

Figure 5:
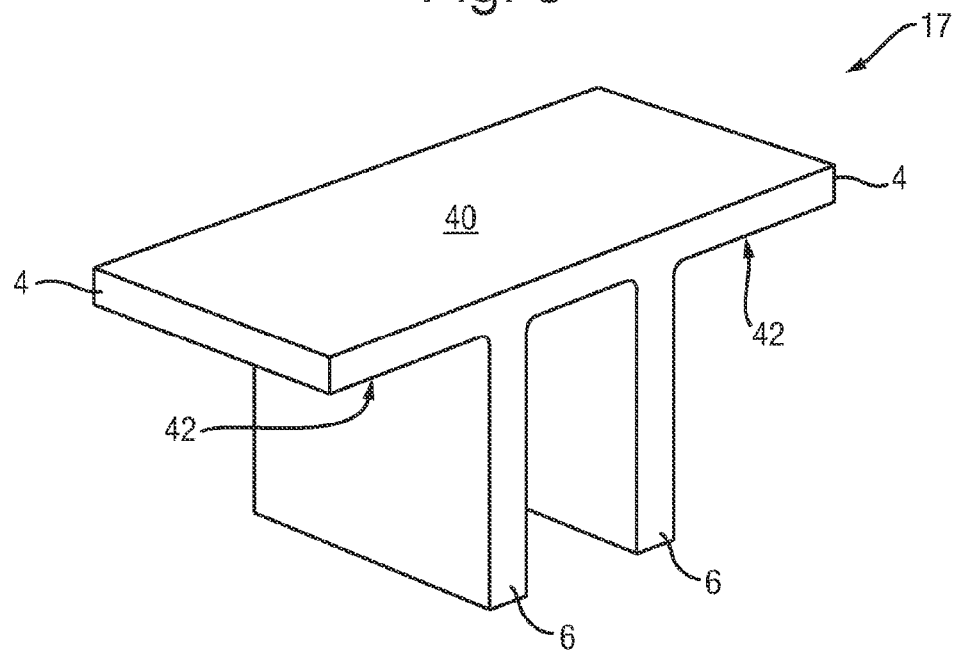
FIG. 5 is a schematic illustration (not to scale) of an initial object.

FIG. 5 is a schematic illustration (not to scale) of the initial object 17.

The initial object 17 comprises the rectangular portion 4 (including the first surface 40 and a second surface 42) and the two further rectangular portions 6 that are connected, along one of their straight edges, to the second surface 42 of the rectangular portion. In other words, the initial object 17 is substantially the same as the object 2 with the curved portions 8 absent.

The initial object 17 is produced by machining a forged titanium block into the desired shape.

At step s10, the AM apparatus is calibrated.

This calibration process may, for example, include accurately measuring the initial object 17 and/or providing or creating a three dimensional digital model of the initial object 17. In some embodiments, a digital model of the initial object 17 is produced by modifying the digital model 14 of the object 2.

This data (i.e. the measurements of the initial model 17 and/or the three dimensional digital model of the initial object 17) may be used to generate a "tool path" (i.e. a path for the AM apparatus to follow) that will be used during the AM process. A "dry run" (i.e. a process in which the AM apparatus is moved along the tool path without applying heating or feedstock to the initial object 17) may be performed. This dry run process may be performed to establish that a geometrical clash condition does not exist. Also, the dry run process may be performed to ascertain whether or not the focal length of a laser of the AM apparatus is correct.

Optionally, values of further parameters of the AM process may also be determined. For example, a laser power density, a feedstock flow rate, X-Y positioning of the AM apparatus, and a melt pool temperature, etc. may be determined. Such parameter values may be determined by conducting an AM process on a test object. The determined parameter values may be used to determine whether or not the AM apparatus is functioning within a specified tolerance range.

In this embodiment, the calibration of the AM apparatus remains the same throughout the process of FIG. 2, i.e. the AM apparatus is not re-calibrated during the process. However, in some embodiments, the AM apparatus is re-calibrated during the AM process, for example if the repair process is interrupted, e.g. by a power cut or mechanical failure.

At step s12, using the AM apparatus, an AM process is performed. The AM process is described in more detail later below with reference to FIG. 5.

The AM process is performed to create (i.e. add or build), on the first surface 40 of the rectangular portion 4 of the initial object 17, the curved portions. Thus, the object 2 (which is described in more detail earlier above with reference to FIG. 1) is produced.

Thus, an embodiment of a process of producing an object is provided.

What will now be described, with reference to FIG. 5, is the AM apparatus used in this embodiment, and the AM process performed in this embodiment, to create the curved portions 8.

FIG. 6 is a schematic illustration (not to scale) showing the AM apparatus 18 being used to create the curved portions 8 of the object 2 by performing an AM process to add structures to the initial object 17.

The AM apparatus 18 comprises a heat source in the form of a high powered laser 20, a source of metallic material in the form of a powder delivery system 22. The AM apparatus 18 further comprises cooling means in the form of a forced cooling nozzle (not shown in the Figure).

The laser 20 may be any appropriate type of laser, for example, an Nd:YAG laser that may operate at a wavelength of 1064 nm, and have a continuous wave power output of, e.g. 500 W, >1 kW, or greater, etc.

The laser 20 is focused upon a focal point 24 on the first surface 40 of the rectangular portion 4 of the initial object 17, whereby to melt the first surface 40 to form a weld pool. The laser 20 is controlled by a computer (not shown in the Figures) to deliver a laser beam via an optical fibre 28 to conventional focussing optics 30 which focus the laser beam to the focal point 24 on the first surface 40 of the object 2.

The powder delivery system 22 delivers powder to the vicinity of the laser focal point 24. Thus, the powder is fully melted as it is deposited on the first surface 40 of the rectangular portion 4 to form a layer or bead 32.

In this embodiment, the powder is a titanium powder. The powder grains may, for example, have a diameter between 36 μm and 106 μm. The powder delivery system 22 delivers powder through a deposition nozzle 34 along a plurality of delivery lines 36 which may be disposed symmetrically around the deposition nozzle 34. In other embodiments, a different type of material (e.g. a different type of metallic power e.g. stainless steel 316 powder) may be used.

In this embodiment, the AM apparatus 18 is moveable under the control of the computer in the X-Y plane that is parallel to the first surface 40 of the rectangular portion 4, and vertically in the Z direction that is orthogonal to the first surface 40 of the rectangular portion 4. Thus, the laser focal point 24 may be directed to any point in a working envelope in the X-Y plane and vertically so as to accommodate both work pieces of different height and also regions of different height within work pieces.

During operation, the AM apparatus 18 moves in a traverse direction, relative to the rectangular portion 4, which is indicated by an arrow 28

In this embodiment, the bead 32 is cooled to a crystallised state using the forced cooling gas nozzle e.g. using air or a cryogenic spray jet.

In this embodiment, many beads are laid down beside one another and built on top of each other to form the curved portions 8.

Thus, AM apparatus 18 for performing an AM process is provided.

The above described methods and apparatus advantageously implement AM processes to produce objects.

Objects (e.g. components of larger structures) that are manufactured or produced by an AM technique tend to have an improved fatigue performance compared to those that are produced by a different type of technique. In particular, objects (having a given cross sectional size) produced by an AM technique tend to be able to withstand a greater maximum stress, and/or withstand a greater number of cycles to failure, when compared to different objects (having the same cross sectional size) produced by a different type of process (i.e. a non-AM process such as a forging or casting process). The above described methods advantageously identify regions or parts of an object (that is to be produced) that, in use, experience high stresses (compared to those stresses experienced, in use, by other parts of the object). These regions are produced using an AM process. Thus, the above described method may be used to produce objects with reduced weight, or enhanced integrity and/or longevity compared to objects produced using only the different non-AM processes.

Thus, additive manufacturing methods may be performed to produce objects with enhanced load bearing and/or longevity characteristics. In other words, the making of objects (e.g. structural components) that last longer and/or are able to carry greater loads before the onset of failure tends to be facilitated.

The above described method is particularly useful in the production of aircraft components and tends to facilitate in the making of more structurally efficient aircraft structures.

Many aircraft components are produced by taking castings, slab stock, plate, bar, or forgings, etc. and then by machining away surplus material to produce the aircraft components.

Typically, when designing components for an aircraft, the thickness (or cross section size) of a given component is determined using certain characteristics of the material from which the component is to be produced. Such characteristics may, for example, include a test-derived relationship between a stress level and number of cycles to failure, i.e. an S-N Curve, or a Wohler curve. Thus, the aircraft components tend to be designed around limitations imposed by the endurance characteristics of the materials used for the component's construction.

Furthermore, to improve the endurance of aircraft components, or to reduce the stress levels experienced by an aircraft component in use, the skilled person would tend to increase the cross sectional area of a component. This would tend to increase the number of cycles that the component may undergo before the onset of failure. However, the mass of the aircraft component would also tend to be increased. Thus, the overall weight of an aircraft upon which that component is used would tend to be increased. Also, the increased mass of the aircraft component onboard the aircraft may adversely affect the aerodynamic performance of the aircraft. Thus, a cost of operating the aircraft upon which that aircraft component part is used would tend to be increased. This may, for example, be because the heavier the aircraft is, and the greater the drag experienced by the aircraft, the more demands is placed on the engines of the aircraft and the more fuel is used during flight.

The above described methods may be used to produce an aircraft component at least portions of which have reduced cross sectional size, and hence lower mass, when compared with similar parts manufactured using only other, non-AM processes e.g. a forging and subtractive machining process. An aircraft component produced in such a way tends to be capable of withstanding an equivalent load, and an equivalent number of design cycles, during the aircraft design life, as the similar part manufactured using only non-AM processes. The aircraft component tends to benefit from advantages in mechanical properties that may be provided by the AM process.

Alternatively an aircraft component may be manufactured such that it has the same cross sectional area as a component manufactured using only non-AM processes. This part would tend to have improved dynamic performance compared to the component manufactured using only non-AM processes.

In other words, the above described methods may be used to produce an aircraft component having the same or similar cross sectional area (and the same or similar mass) as an aircraft component produced using e.g. a moulding process, a forming process, or a machining process, but having an improved fatigue performance. Thus, an aircraft component that is capable of withstanding an increased number of cycles before the onset of failure, but without having increased weight, is provided.

Thus, the above described method may advantageously be used to produce a lower mass aircraft, or an aircraft that may operate for a longer period of time. Furthermore, above described method may advantageously be used to produce an aircraft that is able to could carry a greater structural load such as being capable of withstanding a higher 'g' limit.

In other words, aircraft parts or components produced using an AM technique tend to have improved endurance characteristics compared to aircraft parts or components produced using different types of techniques. By forming the most highly stressed areas of an aircraft component using an AM process, it tends to be possible to build a part that can undergo a higher number of cycles before the onset of failure. In other words, using the above described methods, a structural aircraft component that has a superior 'cycles to failure' property tends to be formed.

By selecting to manufacture, using an AM process, areas of an object that, in use, experience high stress forces, the produced object tends to be improved (compared to if the whole object was produced using only different, non-AM, processes) by virtue of the superior fatigue performance of the grown (i.e. the AM) material.

The accuracy with which the curved portions (i.e. the parts of the object that are produced using the AM process) are produced, and/or surface characteristics of those portions may be measured. These measurements may be used as a measure of the geometrical accuracy of the AM apparatus, and may indicate the quality of AM apparatus optics.

Apparatus, including computing apparatus for providing and/or processing digital models, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the flowchart of FIG. 2 and described above may be omitted or such process steps may be performed in differing order to that presented above and shown in FIG. 2. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the initial object is made of titanium using a forging and subtractive machining process. Also, the AM process is performed to add titanium material to the initial object to produce the object. However, in other embodiments, some or all of the initial object is made of one or more different materials instead of or in addition to titanium (e.g. a different metal or alloy) Also, in other embodiments, some or all of the initial object is made using a different process instead of or in addition to the forging process (for example, a moulding process, a forming process, a casting process, a machining process etc.). Also, the AM process may be performed to add a different material to the initial object (e.g. a material or alloy that has desirable or improved mechanical properties over and above that of the base material).

In the above embodiments, the object produced by performing the method of FIG. 2 is as described above with reference to FIG. 1. However, in other embodiments, the object has a different size and/or shape to that described above.

In the above embodiments, the AM process performed is a laser blown powder AM process in which powder is blown onto a weld pool on an object that has been created by a laser. However, in other embodiments, the AM process is a different type of AM process, for example, a powder bed fusion process, a sheet lamination process, a vat photo-polymerisation process, a Laser Powder Bed process, or an AM process that implements Wire and Arc technologies.

In the above embodiments, for the object that is to be produced, regions that, in use, experience relatively high stresses (compared to other parts of the object to be produced) are identified. The parts of the object that have over a predetermined threshold proportion of those identified regions are produced using an AM process. Other parts of the object are produced using a different process (e.g. forging and machining). However, in other embodiments, for the object that is to be produced, parts of the object are identified as those that are to be produced using the AM process using different appropriate criteria. For example, parts of the object that satisfy one or more different criteria (instead of or in addition to the criterion of experiencing, in use, relatively high stresses) may be determined to be parts that are to be produced using the AM process. In some embodiments, objects or parts that are "fatigue critical" are those that are to be produced using the AM process instead of or in addition to those parts that experience relatively high stress. A "fatigue critical" part of an aircraft may, for example, be a part that, if that part failed due to fatigue, would lead to the loss of an aircraft, or to the abandonment of a mission. Examples of aircraft parts that may be deemed to be fatigue critical include, but are not limited to, wing/ vertical stabiliser to fuselage brackets, undercarriage to fuselage structure, marry up joints, engine mounting attachment points etc.

Also for example, in other embodiments, parts of the object that, during use of the object, experience stress forces above a predetermined threshold force value are identified as parts that are to be produced using the AM process.

In the above embodiments, for the object that is to be produced, regions that, in use, experience relatively high stresses (compared to other parts of the object to be produced) are identified. The parts of the object that have over a predetermined threshold proportion of those high-stress regions are produced using an AM process and are produced such that they have the lower cross sectional area (and/or mass) as they would have if those parts were produced using the different process (e.g. forging and machining). Thus, an object having a reduced mass in the fatigue critical area, and yet still achieve a given loading spectrum and aircraft design life, as compared to a conventionally manufactured part. This weight saving, when considered across multiple parts and platforms, tends to be significant and provides all of the benefits that those skilled in the art would recognise as being desirable, such as lower aircraft mass, increased operational range, and fuel savings, etc.

Alternatively, in other embodiments, the parts of the object that have over a predetermined threshold proportion of high-stress identified regions are produced using an AM process and are produced such that they have the a similar or the same cross sectional area (and/or mass) as they would have if those parts were produced using the different process (e.g. forging and machining). Such an object would tend to have an improved fatigue strength compared to a conventionally produced part, thereby allowing the object to carry a greater load. This may allow the number of objects used to be reduced.

These parts, or the most highly stress portion of the parts could be manufactured at reduced cross section However, in other embodiments, the parts of the object that have over a predetermined threshold proportion of the identified regions are produced such that they have a smaller cross sectional area (and/or mass) than they would have if the object was produced using the different process (e.g. forging and machining).

Thus, an object having the same or similar fatigue performance that it would have if the object was produced using the different process (e.g. forging and machining) is produced. Also, the produced object tends to have a lower mass than it would have if the object was produced using the different process (e.g. forging and machining).

Thus, the above described method advantageously be used to manufacture objects that have a reduced weight but are still able to withstand a given dynamic environment (i.e. capable of withstanding a given loading, or capable of undergoing a given number of cycles before the onset of failure).

This reduction in mass of an object (e.g. an aircraft component) is particularly useful in the production of aircraft components and tends to facilitate in the making of more structurally efficient aircraft structures.

The above described methods may be used to producing an aircraft component that has a reduced mass, but substantially the same fatigue performance as it would have if that component was made using a different process (e.g. forging). This reduced mass component may be used to construct an aircraft that would have a relatively lower mass. Thus, operating costs (e.g. fuel, etc.) of an aircraft may be reduced. Also, this tends to reduce production costs of the aircraft, as less material may be used.

In some embodiments, the object produced using the above described method is an aircraft component. Also, in some embodiments, after production of the object, the produced object is used onboard an aircraft.

What is claimed is:

1. A method of producing an object (2), the method comprising:
   providing an initial digital model (14) of the object (2) that is to be produced;
   using the initial digital model, identifying, by a processor, a part (8) of the object (2) that would experience a stress force in excess of a predetermined threshold value if the object (2) was loaded with a predetermined load;
   adjusting, in the initial digital model (14), the thickness of the identified part (8) to be less than a thickness value, thereby producing an updated digital model, wherein the thickness value is a minimum thickness for the identified part (8) that, if the part (8) was made from a predefined material using a first production process, would allow the identified part (8) to withstand being loaded with the predefined load for a predefined number of design cycles;
   performing the first production process to produce an initial object (17) comprising the part or parts (4, 6) of the object (2) other than the identified part (8); and
   using the updated digital model, performing, using an Additive Manufacturing apparatus (18), a subsequent Additive Manufacturing process to add, to the initial object (17), the identified part (8), thereby producing the object (2); wherein
   the initial object (17) and the identified part (8) of the object (2) are made of the same predefined material; and
   the first production process is a different type of process to the subsequent Additive Manufacturing process.

2. The method according to claim 1, wherein the object (2) is a component part of an aircraft.

3. The method according to claim 1, wherein the first production process comprises one or more production processes selected from the group of production processes consisting of: a subtractive manufacturing process, a forging process, Rolled Plate or bar process, a casting process, a moulding process, a forming process, and a machining process.

4. The method according to claim 1, wherein the subsequent Additive Manufacturing process is a process selected from the group of Additive Manufacturing processes consisting of: a blown powder Additive Manufacturing process, a powder bed fusion Additive Manufacturing process, a sheet lamination Additive Manufacturing process, a laser blown powder Additive Manufacturing process, a laser powder bed Additive Manufacturing process, and an Additive Manufacturing process that implements wire and electron beam or arc technology.

5. The method according to claim 1, wherein, were the object (2) to be loaded with the predetermined load, the identified part (8) would experience a stress force that is relatively high compared to those forces that occur in other parts of the object.

6. The method according to claim 1, wherein, were the object (2) to be loaded with the predetermined load, a proportion of the identified part (8) in which relatively high stress forces occur exceeds a predetermined threshold proportion.

7. The method according to claim 1, wherein the step of identifying a part (8) of the object (2) that would experience a stress force in excess of a predetermined threshold value if the object (2) was loaded with a predetermined load comprises performing a finite element analysis process on the digital model (14).

8. The method according to claim 1, wherein the step of adjusting the thickness of the identified part (8) in the digital model (14) comprises adjusting the thickness of that part (8) to be equal to a further thickness value; and
   the further thickness value is a minimum thickness for the identified part (8) that, if the part (8) was made from the predefined material using the subsequent Additive Manufacturing process, would allow the identified part (8) to withstand being loaded with the predefined load for the predefined number of design cycles.

9. The method according to claim 1, wherein the step of performing the subsequent Additive Manufacturing process comprises:
   providing a further digital model, the further digital model being a digital model of the initial object (17); and
   using the further digital model and the updated digital model, determining, by a processor, a tool path for the Additive Manufacturing apparatus (18); and
   following, by the Additive Manufacturing apparatus (18), the determined tool path.

10. The method according to claim 1, wherein the object (2) is made of titanium.

11. Apparatus for producing an object (2), the apparatus comprising:
    one or more processors configured to:
    using an initial digital model (14) of the object (2) that is to be produced, identify a part (8) of the object (2) that would experience a stress force in excess of a predetermined threshold value if the object (2) was loaded with a predetermined load;
    adjust, in the initial digital model (14), the thickness of the identified part (8) to be less than a thickness value, thereby producing an updated digital model, wherein the thickness value is a minimum thickness for the identified part (8) that, if the part (8) was made from a predefined material using a first production process, would allow the identified part (8) to withstand being loaded with the predefined load for a predefined number of design cycles;
    production means configured to perform the first production process to produce an initial object (17) comprising the part or parts (4, 6) of the object (2) other than the identified part (8); and
    Additive Manufacturing apparatus (18) configured to, using the updated digital model, perform a subsequent Additive Manufacturing process to add, to the initial object (17), the identified part (8), thereby producing the object (2); wherein
    the initial object (17) and the identified part (8) of the object (2) are made of the same predefined material; and
    the first production process is a different type of process to the subsequent Additive Manufacturing process.

12. A computer system comprising:
    one or more processor and memory, wherein instructions are stored in the memory that, when executed by the one or more processors, cause the one or more processors to perform operations in accordance with the method of claim 1.

13. A computer-readable non-transitory storage medium storing instructions that, when executed by a computing device, cause the computing device to perform operations in accordance with the method of claim 12.

\* \* \* \* \*